UNITED STATES PATENT OFFICE.

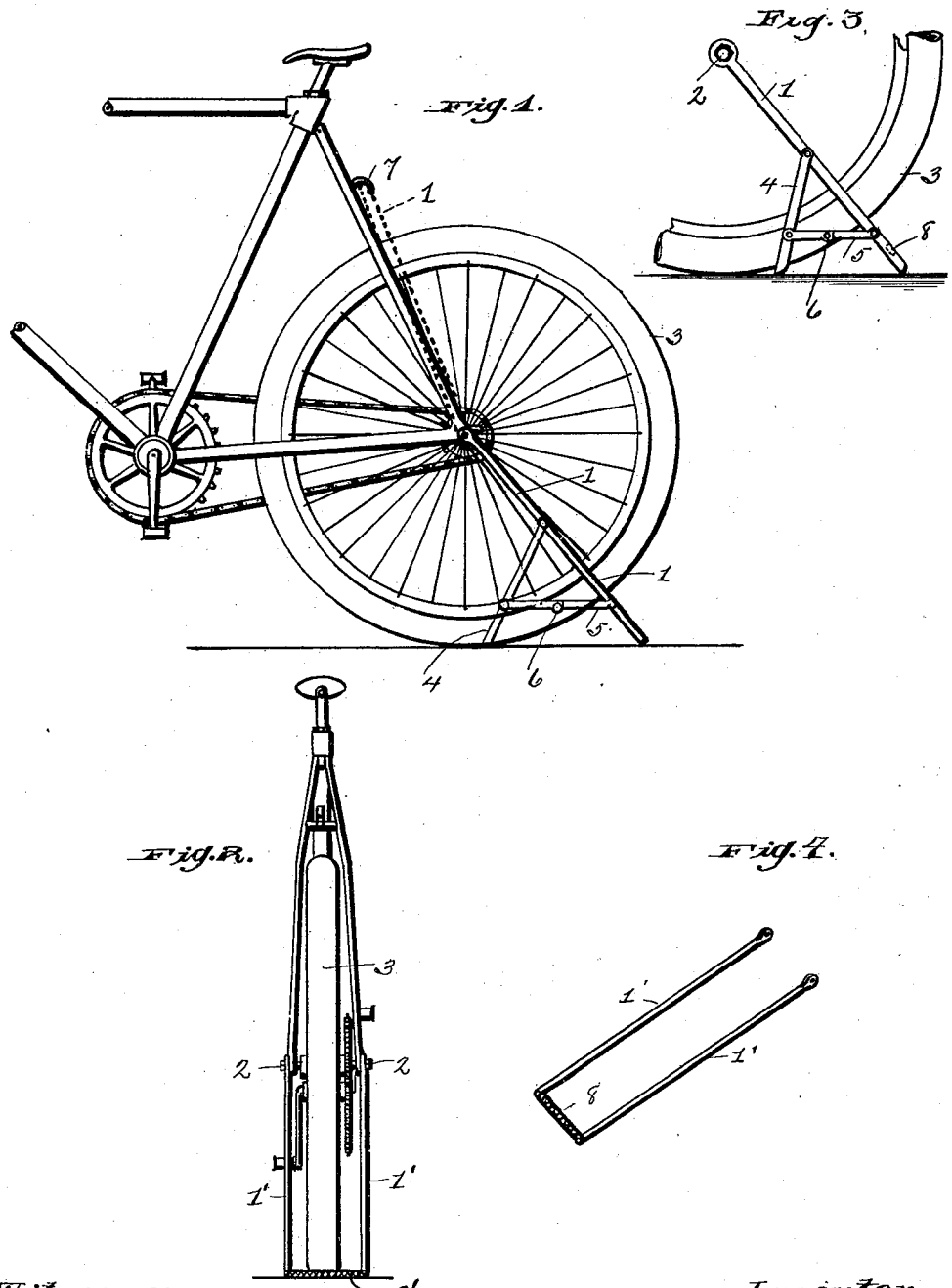

JOSEPH G. BEALE, OF LEECHBURG, PENNSYLVANIA.

BICYCLE-SUPPORT.

SPECIFICATION forming part of Letters Patent No. 711,462, dated October 21, 1902.

Application filed August 1, 1900. Serial No. 25,526. (No model.)

*To all whom it may concern:*

Be it known that I, JOSEPH G. BEALE, a citizen of the United States of America, residing at Leechburg, in the county of Armstrong and State of Pennsylvania, have invented certain new and useful Improvements in Bicycle-Supports; and I do hereby declare the following to be a full, clear, and exact description thereof, reference being had to the accompanying drawings, which form a part of this specification.

This invention relates to an improved bicycle-support; and it consists in a device connected to the rear axle capable of being folded against the frame of the bicycle or dropped down to form a support when the bicycle is not in use; and the invention further consists in the certain details of construction and combinations of parts, as will be fully hereinafter described.

In the accompanying drawings, Figure 1 is a side elevation of the rear portion of a bicycle, showing my improved support attached thereto, the same being constructed and arranged in accordance with my invention. Fig. 2 is an end elevation of the same, showing a modified form of support. Fig. 3 is a side elevation of the support in the lowered or supporting position, showing a part of the bicycle-wheel. Fig. 4 is a perspective view of the modified form of my improved support shown in Fig. 2.

To put my invention into practice, and thereby provide an attachment to a bicycle whereby the same may be held or supported in a vertical position while the same is stationary or not in use, I attach to the rear axle of the wheel 3 two downwardly-extending arms 1, the one connected to the other by a cross-bar 8 and arranged at opposite sides of the wheel 3. Connected to each of these arms or supports 1 are braces 4, attached in a manner that will permit the folding of the same parallel with the supports 1, and the said braces 4 limited in their movement by a toggle connection 5 6.

To support the wheel in a vertical position, the arms 1 are thrown down in contact with the floor or street-pavement, as shown at Figs. 1 and 3 of the drawings, and when the support is not in use the same is revolved upward to the position shown in dotted lines at Fig. 1, and, if desired, secured in that position by the clip 7. When the support is in this folded position above described, the braces 4 are also folded to a position parallel to the supports 1 by operating the toggle connection 5 6.

In Figs. 2 and 4 I show a modified form of support in which the arms 1' are connected together at their extreme lower ends by a cross-bar 8', which when the arms are in the lowered or supporting position will engage with the floor or pavement instead of the lower ends of the arms engaging therewith and give a greater supporting-surface. In this construction, as in that shown in Figs. 1 and 3, the upper ends of the arms are provided with apertures or eyes to receive the rear axle of the bicycle.

The advantages of a support for bicycles constructed as described are that the support is a fixture on the wheel and at all times ready for instant use and may be folded to a position that will not in any manner interfere with the operation of the bicycle.

Various slight modifications and changes may be made in the details of construction without departing from the spirit of the invention.

Having thus described my invention, what I claim, and desire to secure by Letters Patent, is—

A bicycle-support comprising an approximately U-shaped frame having openings formed in its arms' free ends, a forwardly-extending brace-rod pivotally connected to each of the arms of said frame and a toggle connection between the said brace-rods and the frame, said frame adapted to be journaled on the rear bicycle-axle whereby it can be thrown up vertically into engagement with the bicycle-frame when not in use, and when in lowered position contact with the floor at a point in the rear of the wheel, and the lower end of said brace-rods adapted to contact the floor at a point substantially in vertical alinement with the rear axle of the bicycle whereby forward as well as rearward movement of the bicycle is prevented.

In testimony whereof I have hereunto affixed my signature in the presence of two subscribing witnesses.

JOSEPH E. BEALE.

Witnesses:
JOHN GROETZINGER,
O. SINET.